Aug. 4, 1959  J. K. HINES ET AL  2,897,602
PORTABLE GRAIN DRYER
Filed April 18, 1958  3 Sheets-Sheet 2
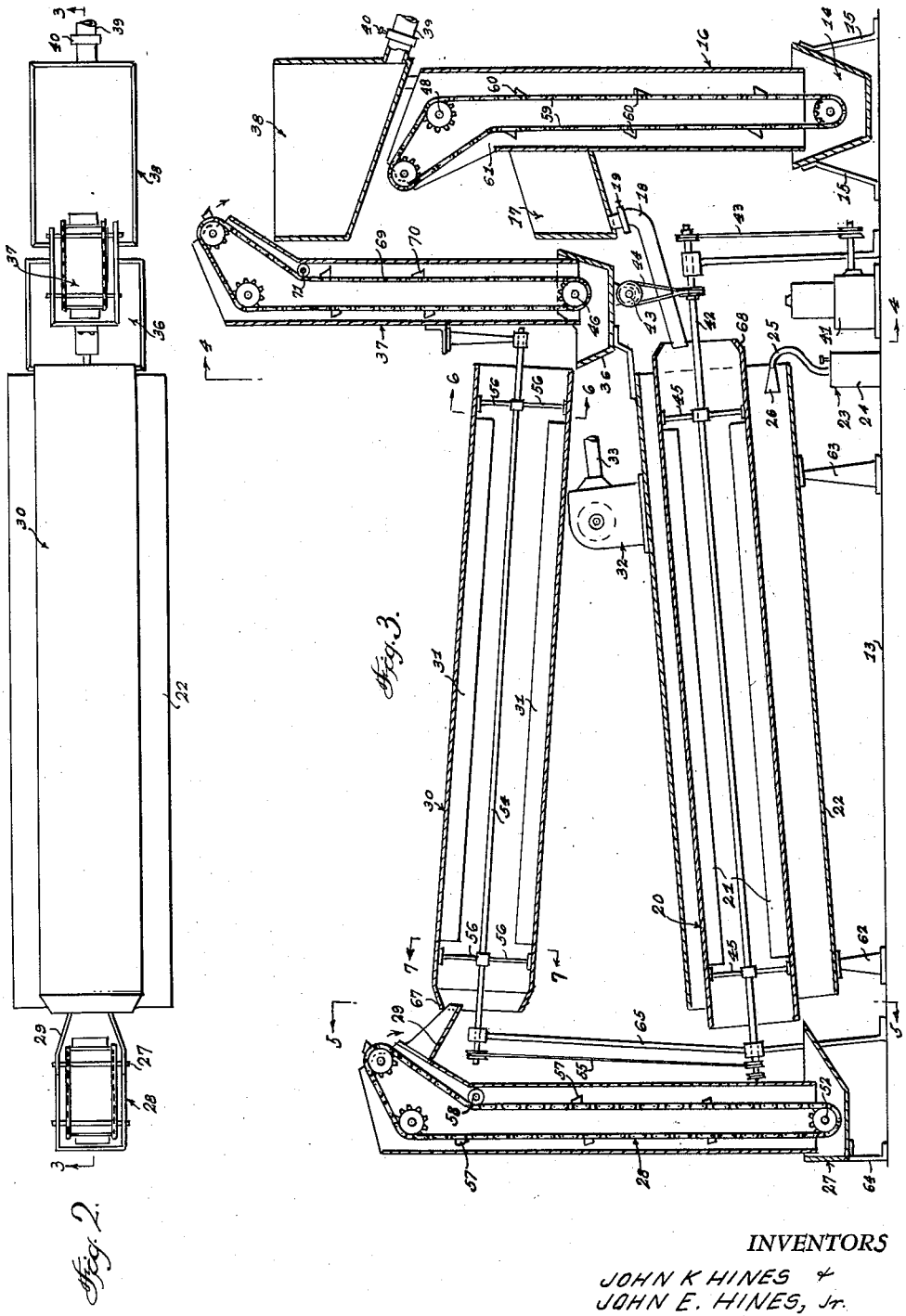
INVENTORS
JOHN K HINES &
JOHN E. HINES, Jr.
BY Victor J. Evans & Co.
ATTORNEYS

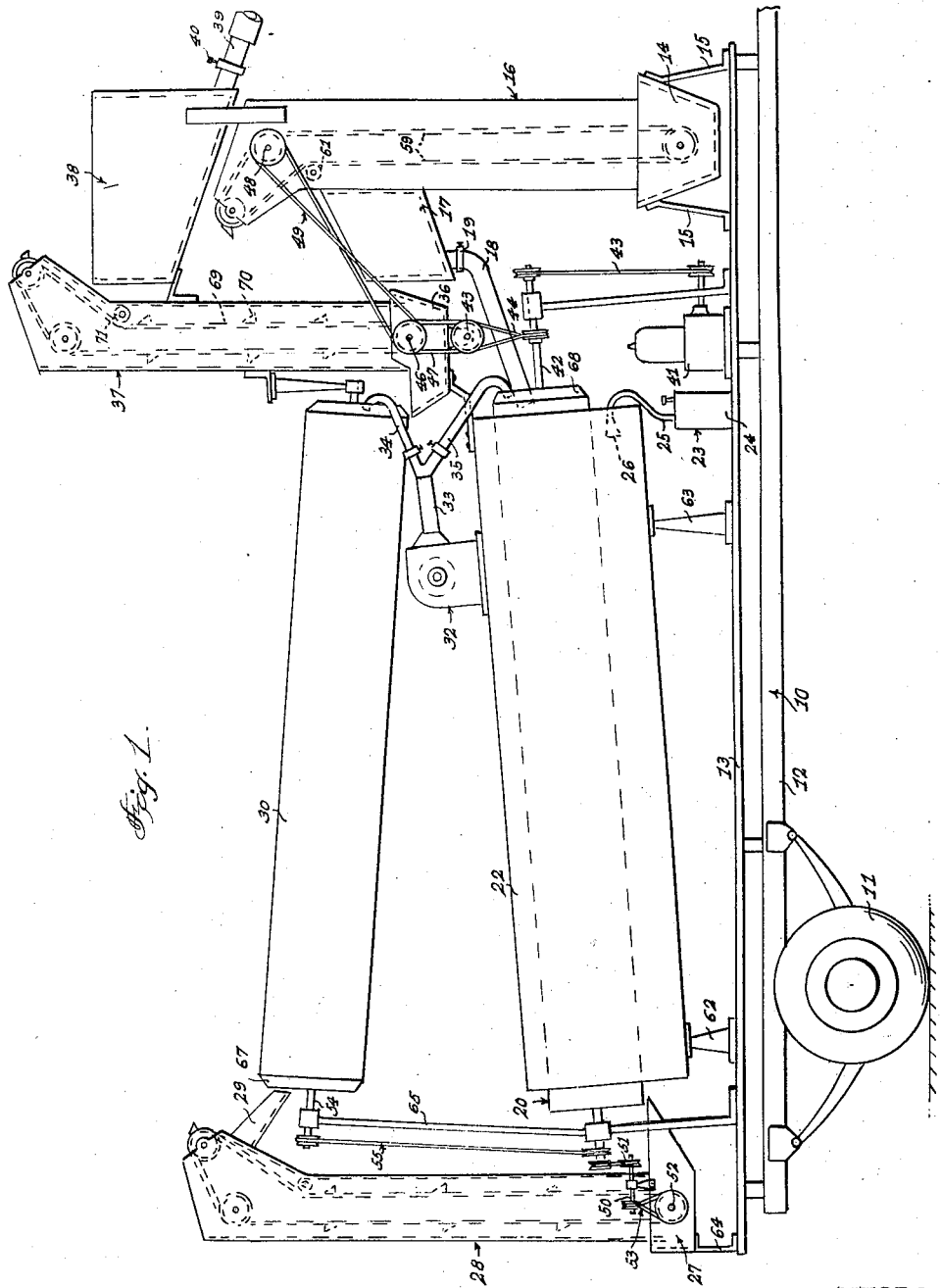

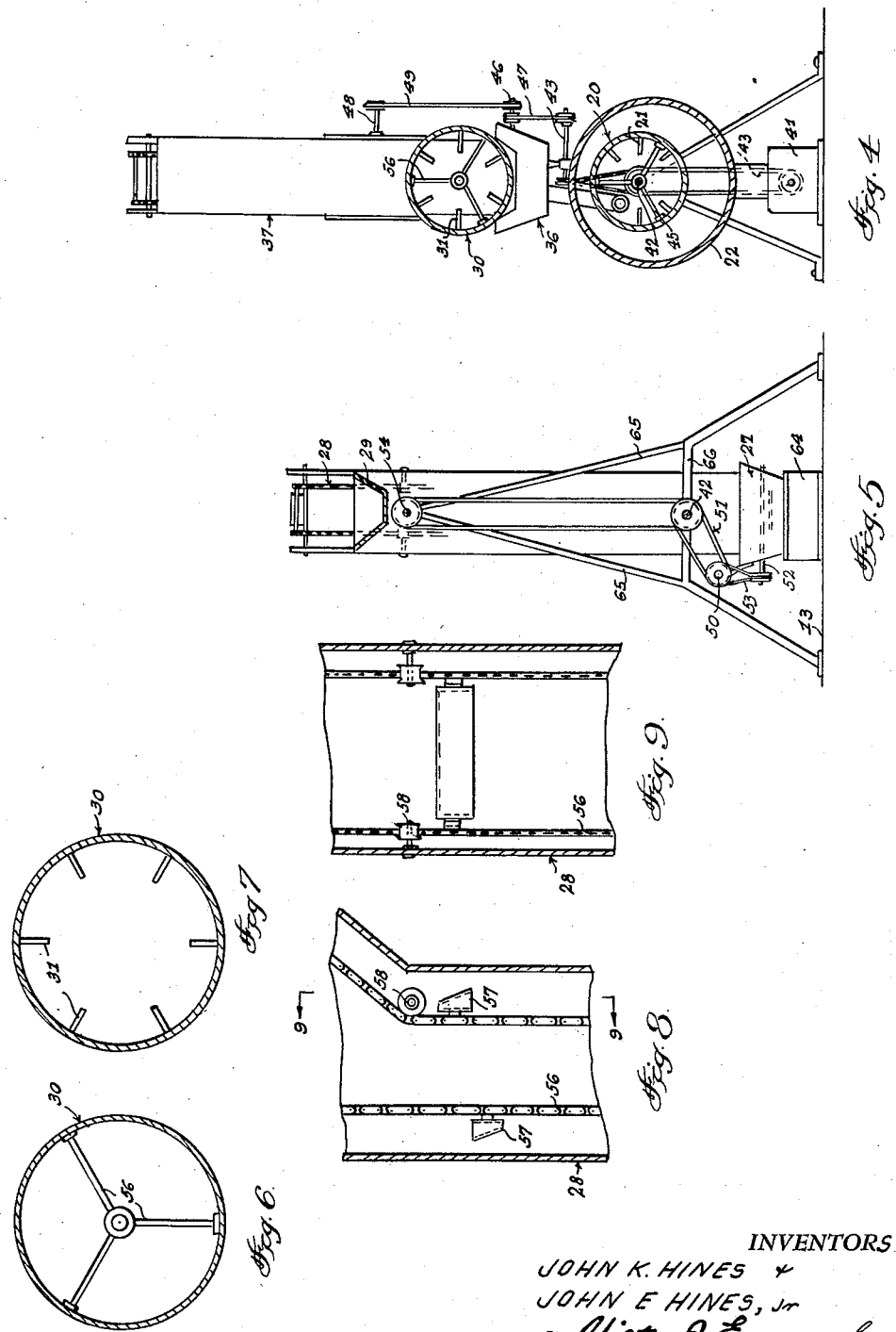

2,897,602

PORTABLE GRAIN DRYER

John K. Hines and John E. Hines, Jr., Centerview, Mo.

Application April 18, 1958, Serial No. 729,435

1 Claim. (Cl. 34—63)

This invention relates to a portable grain dryer.

The object of the invention is to provide a portable grain dryer which is adapted to be used for drying various types of materials such as grains, feed or the like.

Another object of the invention is to provide a grain dryer which can be moved from place to place as desired, and wherein the grain dryer is constructed so that grain or other material which is loaded into the device will be moved through a plurality of successive zones or stages so that moist grain will be dried and wherein the end or finished product will be dry grain which can be conveyed to any suitable locality.

A further object of the invention is to provide a portable grain dryer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the portable grain dryer of the present invention.

Figure 2 is a top plan view of the portable grain dryer.

Figure 3 is a vertical sectional view taken through the portable grain dryer, and taken on the line 3—3 of Figure 2.

Figure 4 is a sectional view taken on the line 4—4 of Figure 3.

Figure 5 is a sectional view taken on the line 5—5 of Figure 3.

Figure 6 is a sectional view taken on the line 6—6 of Figure 3.

Figure 7 is a sectional view taken on the line 7—7 of Figure 3.

Figure 8 is a fragmentary sectional view illustrating a portion of the conveyor.

Figure 9 is a sectional view taken on the line 9—9 of Figure 8.

Referring in detail to the drawings, the numeral 10 indicates a support member which is mounted on wheels 11 so that the support member 10 is portable whereby it can be readily moved or towed from place to place as desired or required. The support member 10 includes a chassis 12, and a platform 13. Mounted adjacent one end of the support member 10 is a bin 14 which is adapted to receive grain or other material from a suitable source of supply, and the bin 14 is supported by braces 15, Figure 1. The numeral 16 indicates an elevator which is adapted to be used for raising the grain or other material from the bin 14, and the elevator 16 discharges the grain from its upper end into a trough 17. A discharge pipe 18 is connected to the trough 17, and a gate valve 19 is mounted in the pipe 18 whereby the valve 19 can be used for controlling flow of grain through the pipe 18.

The numeral 20 indicates an inclined tube which is rotatably supported, and the rotary tube 20 is provided with a plurality of inner longitudinally extending baffles or agitators 21. The tube 20 is adapted to receive grain from the lower end of the discharge pipe 18, as for example as shown in Figures 1 and 3. The numeral 22 indicates a cylindrical casing which is mounted in surrounding relation with respect to the tube 20, and the casing 22 is stationary, while the tube 20 rotates. The numeral 23 indicates a heater of conventional construction which is mounted on the support member 10, and the heater 23 includes a fuel storage tank 24 and a conduit 25 which has a nozzle 26 connected thereto, and the nozzle 26 is adapted to discharge hot air or heat into the space between the casing 22 and the tube 20 so that as the grain moves through the rotating tube 20, the moisture from the grain will be driven off whereby the grain will be dried.

The warm or heated grain from the lower end of the tube 20 discharges into a tray 27, and the grain is lifted upwardly out of the tray 27 by means of an upstanding conveyor 28. The grain is discharged from the upper end of the conveyor 28 and falls into an inclined guide member 29, and from the guide member 29 the grain passes into a rotating drum 30. The drum 30 is provided with a plurality of inner baffles or agitators 31 as shown in Figure 3 for example.

There is further provided a blower or fan which is indicated by the numeral 32, and a flue 33 is connected to the blower 32, there being spaced apart conduits 34 and 35 connected to the flue 33. The conduit 34 is adapted to be used for directing air into the lower end of the drum 30 so that the grain passing through the drum will be efficiently cooled. The conduit 35 serves to direct air into the upper end of the tube 20 so that moisture which accumulates in the tube can be efficiently driven out or forced out through the lower end of the tube.

The numeral 36 indicates a stationary pan which is adapted to receive grain from the lower end of the drum 30, and a lift 37 is provided for raising or lifting the grain upwardly out of the pan 36. The grain then drops out of or is discharged from the upper end of the lift 37 into a hopper 38, and a discharge pipe 39 is connected to the hopper 38 whereby material from the hopper 38 can be conveyed to a truck, trailer, or any other locality. A valve 40 is provided in the pipe 39 for controlling discharge of material out through the pipe 39.

The driving mechanism for the portable grain dryer consists of a motor or engine 41 which is mounted on the support member 10, and the motor 41 serves to rotate a first shaft 42 through the medium of a belt and pulley mechanism 43. A second shaft 43' is mounted below the pan 36, and a belt and pulley mechanism 44 connects the shafts 42 and 43' together. Arms 45 serve to connect the shaft 42 to the tube 20, so that as the shaft 42 rotates, the tube 20 also rotates.

The numeral 46 indicates a third shaft which is connected to the second shaft 43' through the medium of a belt and pulley mechanism 47. A fourth shaft 48, which forms part of the elevator 16, is connected to the third shaft 46 through the medium of a belt and pulley mechanism 49.

The drive mechanism further includes a fifth shaft which is indicated by the numeral 50, and the shaft 50 is driven from the first shaft 42 through the medium of a belt and pulley arrangement 51. The numeral 52 indicates a sixth shaft which is driven from the fifth shaft 50 through the medium of a belt and pulley mechanism 53, and it will be seen that the sixth shaft 52 forms part of the conveyor 28. Thus, the sixth shaft 52 is actually the lowermost shaft of the conveyor 28. The numeral 54 indicates a seventh shaft which is driven by the first shaft 42 through the medium of a chain and sprocket or belt and pulley mechanism 55. Arms 56 serve to connect the shaft 54 to the drum 30, so that as the shaft 54 turns, the drum 30 will likewise turn or rotate.

As shown in the drawings, the conveyor 28 consists of endless chains 56, buckets or scoops 57, and an idler roller 58.

The elevator 16 has a construction which is similar to the conveyor 28, and it will be seen that the elevator 16 includes endless chains 59 which are trained over suitable sprockets, and these sprockets are mounted on shafts, the chains 59 having scoops 60 connected thereto, and wherein the elevator 16 is provided with an idler roller 61.

The casing 22 is supported in an inclined position by means of braces 62 and 63. The tray 27 may be supported by a bracket 64, Figure 3. As shown in Figure 5, braces 65 and 66 are provided, and it is to be understood that suitable braces and bearings can be provided or used wherever desired or required. The upper end of the drum 30 is flared or turned inwardly as at 67, and the upper end of the tube 20 is turned inwardly or flanged inwardly as at 68, and these inwardly turned portions 67 and 68 serve to help insure that grain will not accidentally pass out of the wrong end of the drum or tube.

From the foregoing, it is apparent that there has been provided a portable grain dryer and it is to be noted that according to the present invention, the entire assembly is mounted on the mobile support member 10 so that the support member 10 can be towed or moved to any desired location such as in a field or the like. The wheels 11 permit the device to be conveniently moved from place to place as desired. The entire assembly is self-contained and with the device positioned at the desired location, it is to be noted that grain or other material to be dried is emptied or loaded into the bin 14. Then, with the motor 41 actuated, it will be seen that the elevator 16 will raise the grain from the bin 14 and this grain will be discharged from the upper end of the elevator 16 into the trough 17. The grain will then pass out through the pipe 18, and the valve 19 can be used for controlling the flow of material through the pipe 18. This grain then passes into the revolving tube 20 which is inclined, and as the grain passes through the rotating tube 20, it is stirred up or agitated by the paddles 21. At the same time, the grain passing through the tube 20 is acted upon by the warm air or heat which is generated by the heater 23, and this heat is supplied to the space between the tube 20 and casing 22 so that as the grain moves through the tube 20 by gravity, moisture in the grain will be driven off so that the grain leaving the lower end of the tube 20 will be dry. The blower 32 generates a supply of cool air which passes through the duct or conduit 35, and this air from the conduit 35 is directed into the upper end of the tube 20 so that the moisture laden air in the tube 20 will be driven out of the tube so that the device can continue to operate efficiently.

The dry grain which drops from the lower end of the tube 20 is received in the tray 27, and the conveyor 28 lifts this grain from the tray 27 and deposits the grain in the guide member 29. From the guide member 29 the grain passes into the upper end of the inclined rotating drum 30. The duct 34 supplies cool air from the blower 32 into the lower end of the drum 30, so that as the grain moves through the inclined drum 30 by gravity, the air from the duct or conduit 34 will cool off the grain, and this grain will then drop from the lower end of the rotating drum 30 into the pan 36. The grain is then lifted up out of the pan 36 by means of the lift mechanism 37, and the grain is then discharged into a hopper 38. A pipe 39 leads from the hopper 38 whereby the dried grain or other material can be loaded into trucks, trailers or receptacles or the like. The valve 40 is provided for controlling the flow of material through the pipe 39.

The paddles 31 help agitate the material passing through the drum 30 so that all of the grain passing through the drum will be properly cooled to the desired temperature.

The motor 41 which is mounted on the support member 10 serves as a power source for the entire mechanism. Thus, as the motor 41 is actuated, it drives the shaft 42 through the belt and pulley mechanism 43. This actuation or rotation of the shaft 42 results in rotation of the shaft 43' through the medium of the belt and pulley mechanism 44, and as the shaft 43' rotates, it causes rotation of the shaft 46 through the medium of the belt arrangement 47. The shaft 46 constitutes the lower end portion of the lift 37, so that this operation or rotation of the shaft 46 causes the necessary actuation of the lift 37.

The lift 37 includes endless chains 69, buckets or scoops 70 which are movable to raise the grain up out of the pan 36, and an idler roller 71.

The shaft 46 transmits power to the shaft 48 through the belt drive 49, and the shaft 48 forms part of the elevator 16. The shaft 42 also serves to rotate a shaft 50 through a belt drive 51, and the shaft 50 rotates a shaft 52 through a belt drive 53. The shaft 52 forms the lower end of the conveyor 28. The shaft 54 is driven from the shaft 42 through the medium of a belt or chain drive 55, so that it will be seen that the single motor or engine 41 provides the necessary power for operating all the various moving parts.

While the present invention has been described for use in drying grain, it is to be understood that it can be used for drying different types of material. The parts can be made of any suitable material and in different shapes or sizes.

Thus, it will be seen that there has been provided a dryer which is portable and wherein the dryer can be used in stationary work such as for drying grain at elevators. Where moisture is very heavy, and more heat is required, two or more burners or heaters can be used.

The various baffles or paddles 31 and 21 serve to expose the grain to the effect of the warm or cool air so that all of the grain will be treated.

The parts can be made in different sizes depending upon the capacity or amount of grain or material to be handled. The burner 23 may be of the type which operates on or burns kerosene and is adapted to throw a large amount of heat for a considerable distance. The casing 22 may be insulated as required. A valve may be provided for regulating the amount of heat from the member 23. The tank 24 can hold a suitable quantity of kerosene or other fuel. As the grain passes through the tube 20, the moisture is evaporated so that the grain is dried, and the moisture is then blown from the tube 20 by air from the duct 35. The valve 19 regulates the amount of grain going through the heater tube 20. The hopper 38 holds the grain while the wagons or trucks are being changed so that the machine can continue to operate even though no grain is being taken from it. The inwardly flanged portions 67 and 68 prevent grain from accidentally falling out of the wrong ends of the tube or drum.

Thus, it will be seen that there has been provided a portable grain dryer which can be readily moved from one place to another such as from one farm to another and wherein it does not require a specified amount of grain but it can dry a small amount of grain or a large quantity of grain. Furthermore, there is no danger of overheating the grain or scorching the grain since the grain moves continuously in the machine and since the grain does not lay still and since the grain is exposed to circulating air at all times, the grain will not be scorched or burned or the like.

Minor changes in shape, size and rearrangement of details coming within the field of invention claimed may be resorted to in actual practice, if desired.

We claim:

In a portable grain dryer, a wheeled support member, a bin on one end of said support member for receiving grain from a source of supply, an elevator for raising grain upwardly from said bin, a trough for receiving grain discharged from the upper end of said elevator, a discharge pipe connected to said trough, an inclined rotary tube for receiving grain from said pipe, a stationary casing surrounding said tube, a heater on said support member for supplying heat to the space between said tube and casing, a tray for receiving grain from the lower end of said tube, a conveyor for raising grain upwardly from said tray, a guide member for receiving grain discharged from the upper end of said conveyor, an inclined drum for receiving grain from said guide member, a blower for directing air into said drum and into said tube, a pan for receiving grain from the lower end of said drum, a lift for moving grain upwardly from said pan, and a hopper for receiving grain from the upper end of said lift, a motor on said support member, a first shaft extending through said tube and operated by said motor, arms connecting said shaft to said tube so that rotation of said first shaft will cause rotation of said tube, a second shaft mounted below said pan and driven by said first shaft, a third shaft on the lower end of said lift, said third shaft being driven by said second shaft so as to provide power for operating the lift, a fourth shaft driven by said third shaft, said fourth shaft forming part of said elevator, said fourth shaft constituting the power driving shaft for the elevator, a fifth shaft driven by said first shaft, a sixth shaft driven by said fifth shaft, said sixth shaft forming part of said conveyor and defining a power driving shaft for the conveyor, and a seventh shaft driven by said first shaft and connected to said drum for causing rotation of said drum.

References Cited in the file of this patent

UNITED STATES PATENTS

| | | |
|---|---|---|
| 1,151,203 | Lofquist | Aug. 24, 1915 |
| 1,541,902 | Collins | June 16, 1925 |
| 1,965,881 | Clark et al. | July 10, 1934 |
| 2,665,568 | Meyer | Jan. 12, 1954 |
| 2,774,587 | Mayenschein et al. | Dec. 18, 1956 |

FOREIGN PATENTS

| | | |
|---|---|---|
| 683,156 | France | June 6, 1930 |